United States Patent [19]

Rosen

[11] Patent Number: 4,913,562
[45] Date of Patent: Apr. 3, 1990

[54] THERMOPLASTIC BEARING LINER

[75] Inventor: Robert Rosen, Port Washington, N.Y.

[73] Assignee: Thomson Industries, Inc., Port Washington, N.Y.

[21] Appl. No.: 294,208

[22] Filed: Jan. 6, 1989

[51] Int. Cl.$^4$ ............................................. F16C 17/00
[52] U.S. Cl. .................................. 384/276; 384/296; 384/301
[58] Field of Search .................................. 384/29–31, 384/38, 42, 192, 220, 222, 275, 276, 295–297, 299, 300, 301

[56] References Cited

U.S. PATENT DOCUMENTS

| | | |
|---|---|---|
| D. 143,258 | 12/1945 | Aker . |
| D. 227,397 | 6/1973 | Steinke . |
| 2,815,253 | 12/1957 | Spriggs ............................ 384/299 |
| 2,851,314 | 9/1958 | Thomson ........................ 384/222 |
| 2,964,341 | 12/1960 | Doyle et al. . |
| 3,008,779 | 11/1961 | Spriggs . |
| 3,033,623 | 5/1962 | Thomson . |
| 4,509,870 | 4/1985 | Taki ............................... 384/296 |
| 4,603,982 | 8/1986 | Dittrich .......................... 384/129 |
| 4,765,757 | 8/1988 | Hartl ............................... 384/213 |
| 4,767,677 | 8/1988 | Kuwayama . |

FOREIGN PATENT DOCUMENTS 945300  12/1963  United Kingdom ............... 384/300

OTHER PUBLICATIONS

Nyliner Bearing Designer's Guide. (Thomson Industries, Inc. manual) (No Date).

Primary Examiner—Thomas R. Hannon
Attorney, Agent, or Firm—Dilworth & Barrese

[57] ABSTRACT

A bearing liner to be fitted within a housing bore. The bearing liner comprises a hollow cylindrically shaped member having an external circumferential support, such as a rib, located away from the ends of the liner. The bearing liner has a gap extending from one end to the other to facilitate the axial insertion of the bearing liner into the housing bore. An undercut in the housing bore engages the support thereby retaining the bearing liner within the housing.

8 Claims, 3 Drawing Sheets

THERMOPLASTIC BEARING LINER

BACKGROUND OF THE INVENTION

1. Field Of The Invention

This invention relates to bearings for rotary and/or reciprocating shafts, and more particularly to bearing liners constructed from wear resistant plastic material having a low coefficient of friction.

2. Background Of Related Prior Art

A moving shaft supported by a bearing requires a low friction surface where the shaft contacts the bearing. The low friction surface may be attained for example by the application of a lubricant substance such as oil or grease, or by employing a bearing liner constructed from low friction material, or by combining a lubricant oil or grease with the use of a low friction bearing liner.

Bearing liners constructed from wear resistant low friction materials such as nylon, acetal, or polytetrafluoroethylene are known in the art. For example, Thomson, U.S. Pat. No. 3,033,623 discloses a fluorocarbon sleeve bearing comprising a layer of low friction material bonded to the inside of a metal support strip which is coiled into a cylindrical shape with its ends in close adjacency to each other.

Modern bearing liners for rotary and/or reciprocating shafts are molded single piece constructions of low friction plastic which are shaped as hollow cylinders. Similar to the Thomson U.S. Pat. No. 3,033,623 bearing liner, such modern bearing liners typically have a separation or gap extending from one end of the cylinder to the other. This separation or gap allows, inter alia, the bearing liner to be compressed into a smaller diameter so that it may be axially inserted into a housing bore.

In applications where the motion of the shaft exerts axial forces upon the bearing liner, especially with reciprocating shafts, the bearing liner must have a means for retaining it within the housing bore to prevent it from being ejected. Flanges provide such a means. In certain applications a bearing liner will have one or more flanges extending radially from the end or ends of the bearing. The flange or flanges may be external to the housing bore and overlap the edge of the bore to provide for retention of the bearing liner, or the flange may be received into an undercut in the inside surface of the housing bore where it is engaged when the bearing liner is inserted into the bore.

Notwithstanding, problems sometimes arise in applications such as pneumatic and hydraulic linear actuators when the motion of the shaft is not in perfect alignment with the axis of the bearing. Pivoting motion in a reciprocating shaft, or precession of a rotating shaft, will place great stress at the corner of the bearing liner where the flange is located. Liner flanges often break under the forces exerted by non-axial shaft motion. Non-axial motion of the shaft occurs because there must be some clearance between the shaft surface and the liner in order to permit movement of the shaft.

Clearly, then, an improved bearing liner would not only extend the useful life of the liners made of the type of materials currently being used, but would also permit the construction of liners from low friction materials which heretofore could not be used because of their lower mechanical strength.

SUMMARY OF THE INVENTION

Accordingly, it is one objective of the present invention to provide a novel and improved bearing liner.

It is another object of the present invention to provide a novel bearing liner which will allow the low friction properties of the bearing liner to be optimized.

It is yet another object of the present invention to provide a low friction bearing liner capable of withstanding the stress of rotary or reciprocating shaft motion.

It is still another object of the present invention to provide a low friction bearing liner with extended useful life.

These and further objects are achieved herein by providing a cylindrical bearing liner to be fitted within a support housing, said support housing having an interior hollow cylindrical bore having a circumferential groove in spaced apart relation to the ends of said bore, said cylindrical bearing liner comprising:

a hollow substantially cylindrically shaped member having two ends and a gap extending from one to the other of said two ends, said cylindrically shaped member further having support means located in a spaced apart relation to said two ends.

DETAILED DESCRIPTION OF THE INVENTION

The bearing liner of the present invention incorporates a support or retaining means comprising at least one external rib located circumferentially on the outer surface of the bearing liner and spaced apart from the ends of the liner. An undercut in the housing bore in which said bearing liner is to be fitted engages the rib thereby retaining the bearing liner in place under the reciprocating or rotary motion of a shaft extending axially through the liner.

Figure 1:
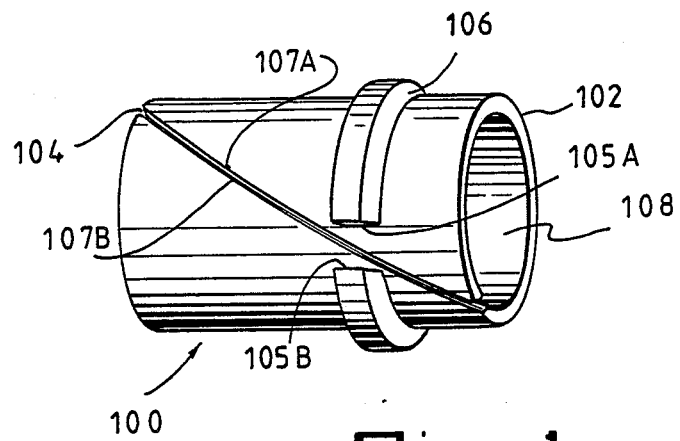
FIG. 1 illustrates a perspective view of the improved bearing liner of the present invention.

Referring now to the drawings, FIG. 1 illustrates a preferred embodiment of the present invention. The bearing liner 100 comprises a flexible, resilient, substantially cylindrically shaped member 102 and a circumferential support or retaining means such as external rib 106.

The bearing liner 100 is preferably molded as a single piece integral construction from a low friction polymeric material such as nylon, acetal, polytetrafluoroethylene, polycarbonate, glass filled nylon, and the like, and may range in any desirable size, for example, less than an inch to several inches in diameter or more.

Cylindrical member 102 has a gap 104 which extends from one to the other of the two ends of the cylindrical member 102. Gap 104 may be helical as shown in FIG. 1, or it may also extend parallel to the axis of cylindrical member 102, or, if desired, it may also be irregularly shaped. Gap 104 may be of relatively small dimension and for example is only slightly greater than that necessary to provide for the maximum thermal expansion that the liner will have. Gap 104 performs several additional functions: the gap permits the bearing liner 100 to be compressed into a smaller diameter so that it can be inserted into a housing bore; gap 104 allows the liner to expand resiliently to contact the interior surface of the bore; and gap 104 may function as a storage reservoir and channel for fluid lubricants which may be employed, additionally trapping particles of grit in the lubricant.

External rib 106 is an integral part of bearing liner 100. Rib 106 projects radially outward from the exterior surface of cylindrical member 102 and extends substantially circumferentially about cylindrical member 102 except at gap 104. That is, rib 106 does not bridge gap 104. As illustrated in FIG. 1, the two opposingly situated ends 105A and 105B of rib 106 are respectively in proximity to one each of the two edges 107A and 107B defining gap 104.

In accordance with the improvement of the present invention rib 106 is located in spaced apart relationship to the ends of the bearing liner 100. The distance of rib 106 from the ends of bearing liner 100 is not critical. That is, rib 106 does not need to be spaced equidistantly from the ends of bearing liner 100 although it may be. In one preferred embodiment, rib 106 may be located closer to one of the two ends of bearing liner 100, as shown in FIG. 1.

Rib 106 need be of sufficient dimension and strength to perform the function of retaining and supporting bearing liner 100 within a housing bore under operating conditions. Although only a single rib 106 is illustrated in the embodiment described herein, it is also within the scope of this invention to use more than one rib to function as the support or retaining means.

The inner surface 108 of bearing liner 100 defines a hollow cylindrical interior for accepting a rotary or reciprocating shaft extending axially therethrough. The inside surface 108 provides support and lubrication for the shaft.

Figure 2:
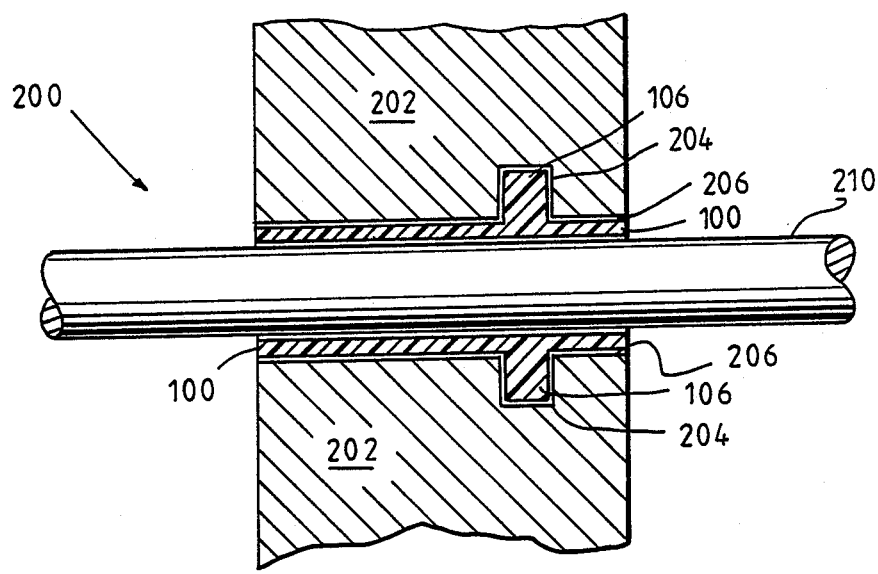
FIG. 2 illustrates a sectional side view of the bearing assembly utilizing the improved bearing liner of the present invention.
Figure 3A:
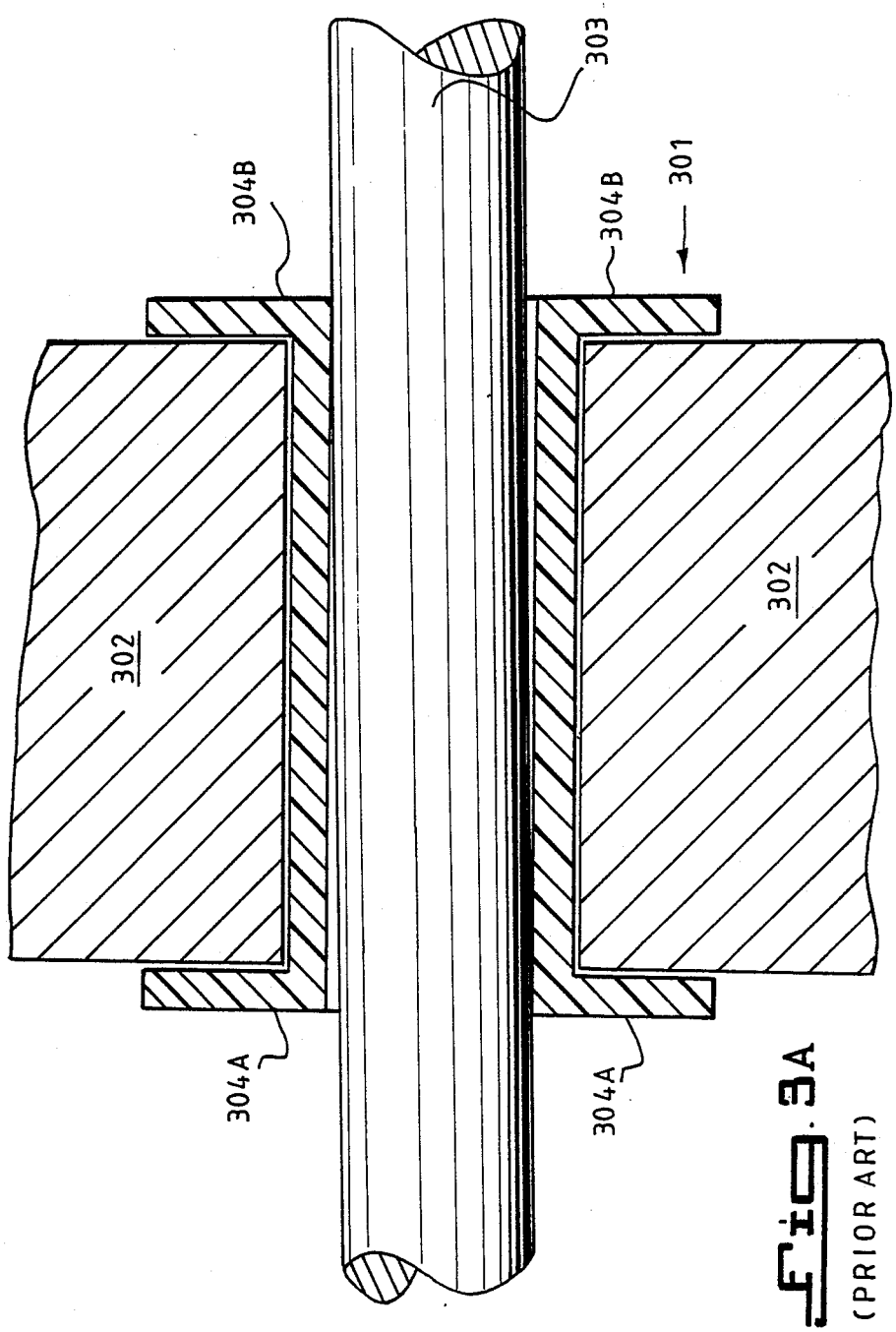
FIG. 3A is a sectional side view of a prior art two flanged bearing liner in a bearing assembly; and, FIG. 3B is a sectional side view of a prior art single flanged bearing liner in a bearing assembly.
Figure 3B:
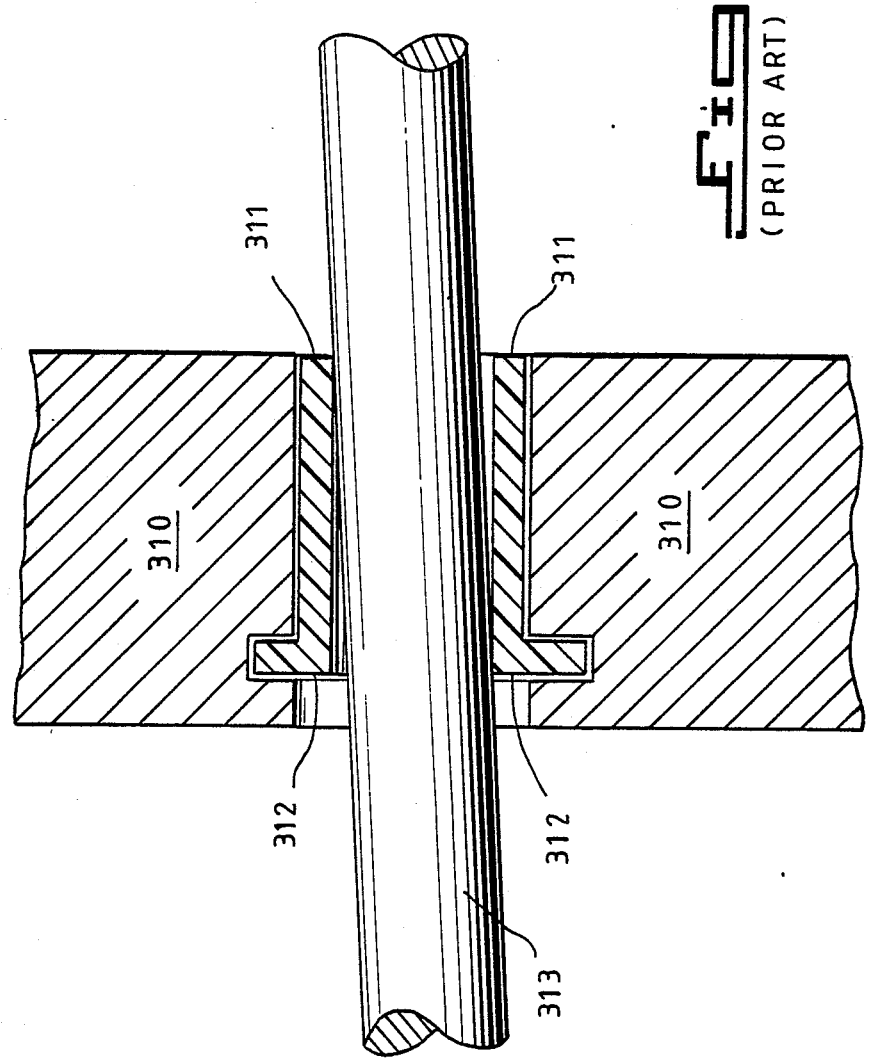

Referring now to FIGS. 2, 3A and 3B, FIG. 2 illustrates a sectional side view of a preferred embodiment as part of a bearing assembly 200. Support housing 202 has a hollow cylindrical bore 206 and a circumferential notch or groove 204 which is undercut into the inside surface of the bore 206 for the purpose of receiving and engaging circumferential rib 106 of the liner 100. Shaft 210 extends axially through the interior of bearing liner 100.

FIG. 3A illustrates a sectional side view of a prior art type bearing liner 301 having radially extending double flanges 304A, 304B—one at each of the two ends of the bearing liner 301. Flanges 304A and 304B overlap the edges of the housing bore to retain liner 301 in the housing. FIG. 3A illustrates how non-axial shaft motion damages the flanges 304A and 304B located at the ends of the prior art bearing liner 301.

Although the deviation of shaft 303 from axial alignment in bearing liner 301 is somewhat exaggerated in FIG. 3A for purposes of illustration, it can readily be seen that whether shaft 303 exhibits reciprocating or rotary motion, any non axial motion will place great stress on the bearing liner 301 where the shaft 303 contacts the corners of flanges 304A and 304B. Application of great stress on the corners where the flanges and cylindrically shaped members intersect in many instances causes the flanges to break off.

FIG. 3B illustrates a sectional side view of another prior art type bearing liner 311 with a single flange 312 located at one end of said bearing liner 311.

Likewise, as in FIG. 3A, the deviation of shaft 313 from axial alignment in bearing liner 311 is somewhat exaggerated in FIG. 3B for purposes of illustration. However, it can readily be seen that whether shaft 303 exhibits reciprocating or rotary motion, any non-axial motion will put great stress in the bearing liner 311 where the shaft 313 contacts the corner of flange 312.

Referring again to FIG. 2, is evident that locating a support or retaining means such as rib 106 in a position spaced at a distance away from the ends of the bearing liner 100, isolates the support or retaining means from the points where greatest stress is applied. Therefore, liner 100 will have a longer useful life, and its material of construction may be chosen to optimize the low friction qualities of the bearing liner 100, rather than for mechanical strength.

While the above description contains many specifics, these specifics should not be construed as limitations on the scope of the invention, but merely as exemplifications of preferred embodiments thereof. Those skilled in the art will envision many other variations which are within its scope. Therefore, although the invention has been described with reference to certain preferred embodiments, it will be appreciated that other bearing liner constructions may be devised which are nevertheless within the scope and spirit of the invention as defined by the claims appended hereto.

I claim:

1. A cylindrical bearing liner to be fitted within a supporting housing, said support housing having an interior hollow cylindrical bore, said cylindrical bore having a circumferential groove in spaced apart relation to the ends of said bore, said cylindrical bearing liner comprising:
   a hollow, substantially cylindrical shaped member having two ends, and a gap extending from one to the other of said two ends,
   said cylindrically shaped member further having support means located in spaced apart relation to said two ends of the cylindrically shaped member said support means comprising at least one external rib extending circumferentially about said cylindrically shaped member and projecting radially therefrom, said rib having two opposingly situated ends, each end being in proximity to one each of the two edges defining said gap in the cylindrically shaped member.

2. The bearing liner of claim 1 wherein said cylindrically shaped member is flexible and resilient.

3. The bearing liner of claim 1 wherein the bearing liner is constructed as an integral single piece.

4. The bearing liner of claim 1 wherein said bearing liner is formed of low friction material.

5. The bearing liner of claim 4 wherein the low friction material is a polymeric material.

6. The bearing liner of claim 5 wherein the polymeric material is selected from the group consisting of nylon, acetal, polycarbonate and polytetrafluoroethylene.

7. The bearing liner of claim 1 wherein said gap extends helically.

8. A low friction cylindrical bearing liner to be fitted within a support housing, said support housing having an interior hollow cylindrical bore, said cylindrical bore having a circumferential groove in spaced apart relation to the ends of said bore, said cylindrical bearing liner comprising:
  a hollow, substantially cylindrically shaped member having two ends, and a helical gap extending from one to the other of said two ends,
  said cylindrically shaped member further having at least one external rib located in spaced apart relation to said two ends of the cylindrically shaped member, said external rib extending circumferentially about said cylindrically shaped member and projecting radially therefrom, said rib having two opposingly situated ends, each end being in proximity to one each of the two edges defining said gap in the cylindrically shaped member.

* * * * *